United States Patent
Shakir et al.

(10) Patent No.: US 10,382,316 B2
(45) Date of Patent: *Aug. 13, 2019

(54) INSTALLING ACTIVE FLOWS IN A FORWARDING TABLE

(71) Applicant: Juniper Networks, Inc., Sunnyvale, CA (US)

(72) Inventors: Ali Ahmed Shakir, Bangalore (IN); Sridhar Talari Rajagopal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/939,975

(22) Filed: Mar. 29, 2018

(65) Prior Publication Data

US 2018/0227213 A1  Aug. 9, 2018

Related U.S. Application Data

(63) Continuation of application No. 15/087,983, filed on Mar. 31, 2016, now Pat. No. 9,935,869.

(51) Int. Cl.
*H04L 12/751* (2013.01)
*H04L 29/12* (2006.01)

(52) U.S. Cl.
CPC .......... *H04L 45/02* (2013.01); *H04L 61/103* (2013.01); *H04L 61/6009* (2013.01); *H04L 61/6022* (2013.01)

(58) Field of Classification Search
CPC . H04L 45/02; H04L 61/6022; H04L 61/6009; H04L 61/103
See application file for complete search history.

(56) References Cited

U.S. PATENT DOCUMENTS

| | | | |
|---|---|---|---|
| 6,772,222 B1 | 8/2004 | Gallo et al. | |
| 6,907,469 B1 | 6/2005 | Gallo | |
| 7,009,968 B2 | 3/2006 | Ambe et al. | |
| 9,935,869 B1* | 4/2018 | Shakir | H04L 45/02 |
| 2004/0090913 A1* | 5/2004 | Scudder | H04L 45/02 |
| | | | 370/219 |
| 2004/0264384 A1 | 12/2004 | Deval | |
| 2009/0238179 A1 | 9/2009 | Samprathi | |
| 2012/0033665 A1 | 2/2012 | Jacob Da Silva et al. | |

(Continued)

*Primary Examiner* — Afshawn M Towfighi
(74) *Attorney, Agent, or Firm* — Harrity & Harrity, LLP (57) ABSTRACT

A device may determine that a route is inactive. Information identifying the route may be stored in a forwarding plane portion of a forwarding table and a control plane portion of the forwarding table. The route may be associated with directing network traffic toward an endpoint network device. The device may remove the information identifying the route from the forwarding plane portion of the forwarding table without removing the information identifying the route from the control plane portion of the forwarding table based on determining that the route is inactive. The device may route network traffic based on the forwarding table after removing the information identifying the route from the forwarding plane portion of the forwarding table without removing the information identifying the route from the control plane portion of the forwarding table.

20 Claims, 8 Drawing Sheets

(56) References Cited

U.S. PATENT DOCUMENTS

| | | | |
|---|---|---|---|
| 2013/0212038 A1* | 8/2013 | Marko | G06F 21/645 705/342 |
| 2014/0003227 A1* | 1/2014 | Scudder | H04L 45/021 370/218 |
| 2014/0119379 A1* | 5/2014 | Liang | H04L 12/4625 370/401 |
| 2015/0312134 A1 | 10/2015 | Kapadia | |

* cited by examiner

INSTALLING ACTIVE FLOWS IN A FORWARDING TABLE

RELATED APPLICATION

This application is a continuation of U.S. patent application Ser. No. 15/087,983, filed Mar. 31, 2016 (now U.S. Pat. No. 9,935,869), which is incorporated herein by reference.

BACKGROUND

A network device may receive network traffic (e.g., a set of packets) for routing via a network. For example, the network device may receive the network traffic from a first endpoint network device, may determine a route for the network traffic, and may direct the network traffic toward a second endpoint network device via the route. The route may be stored via a forwarding table. For example, the network device may store a forwarding table including information identifying a set of layer 2 (L2) routes, a set of layer 3 (L3) routes, a mapping of L2 route addresses to L3 route addresses, or the like.

SUMMARY

According to some possible implementations, a device may include one or more processors. The one or more processors may determine that a route is inactive. Information identifying the route may be stored in a forwarding plane portion of a forwarding table and a control plane portion of the forwarding table. The route may be associated with directing network traffic toward an endpoint network device. The one or more processors may remove the information identifying the route from the forwarding plane portion of the forwarding table without removing the information identifying the route from the control plane portion of the forwarding table based on determining that the route is inactive. The one or more processors may route network traffic based on the forwarding table after removing the information identifying the route from the forwarding plane portion of the forwarding table without removing the information identifying the route from the control plane portion of the forwarding table.

According to some possible implementations, a non-transitory computer-readable medium may store one or more instructions that, when executed by one or more processors may cause the one or more processors to store information identifying a route in a forwarding plane portion of a forwarding table and a control plane portion of the forwarding table. The route may be active. The route may be associated with directing network traffic toward an endpoint network device. The one or more instructions, when executed by the one or more processors, may cause the one or more processors to route network traffic via the route based on storing the information identifying the route. The one or more instructions, when executed by the one or more processors, may cause the one or more processors to determine, after storing the information identifying the route, that the route is inactive. The one or more instructions, when executed by the one or more processors, may cause the one or more processors to remove the information identifying the route from the forwarding plane portion of the forwarding table without removing the information identifying the route from the control plane portion of the forwarding table based on determining that the route is inactive. The one or more instructions, when executed by the one or more processors, may cause the one or more processors to route network traffic based on the forwarding table after removing the information identifying the route from the forwarding plane portion of the forwarding table without removing the information identifying the route from the control plane portion of the forwarding table.

According to some possible implementations, a method may include determining, by a device, that a route has not been utilised to route network traffic for a period of time satisfying a threshold. The route may be associated with directing traffic toward an endpoint network device of a network. The method may include removing, by the device, information identifying the route from a first data structure associated with a forwarding table. The information identifying the route may be stored via a second data structure associated with the forwarding table after removing the information identifying the route from the first data structure. The method may include routing, by the device, network traffic based on the forwarding table after removing the information identifying the route from the first data structure. The method may include adding, by the device, the information identifying the route to the first data structure based on information identifying the route stored via the second data structure and after removing the information identifying the route from the first data structure. The method may include routing, by the device, network traffic based on the forwarding table after adding the information identifying the route to the first data structure.

DETAILED DESCRIPTION

The following detailed description of example implementations refers to the accompanying drawings. The same reference numbers in different drawings may identify the same or similar elements.

A first network device (e.g., a Top of Rack (ToR) network device) may be connected to a network, which includes a set of other network devices. The network device may receive route information from a second network device (e.g., a provider edge network device or another ToR network device), such as via an address resolution protocol (ARP) message or the like. For example, the second network device may determine a layer 2 (L2) media access control (MAC) route (e.g., reachability information), and may advertise the L2 route to the first network device to cause the first network device to direct network traffic to the second network device. Similarly, the second network device may determine a layer 3 (L3) host route, and may advertise the L3 route to the first network device to cause the first network device to direct network traffic to the second network device.

The first network device may install one or more routes in a forwarding table, and may obtain information identifying a particular route from the forwarding table to direct network traffic to the second network device. For example, the first network device may store the L2 route via a control plane portion of the forwarding table (e.g., a portion of the forwarding table associated with determining where to route a packet based on reachability information identifying neighboring network devices). Similarly, the first network device may store an L3 route, corresponding to the L2 route, via a forwarding plane portion (e.g., sometimes referred to as a data plane portion) of the forwarding table (e.g., a portion of the forwarding table associated with forwarding a packet based on an instruction from the control plane).

The first network device may utilize an aging procedure to remove a route from the forwarding table. For example, after a threshold period of time, the first network device may determine that the particular route expired, and may remove the particular route from both the control plane portion and the forwarding plane portion of the forwarding table. Implementations, described herein, may delink the control plane portion of the forwarding table and the forwarding plane portion of the forwarding table. In this way, the forwarding table is caused to install only active routes via the forwarding plane portion of the forwarding table, thereby reducing a utilization of memory resources relative to storing inactive routes via the forwarding plane portion of the forwarding table. Moreover, implementations, described herein, may maintain inactive routes via the control plane portion of the forwarding table. In this way, a time delay associated with re-installing a route when the route returns to active status from inactive status is reduced and network performance is improved relative to removing all information identifying the route from the control plane portion of the forwarding table.

Figure 1A:
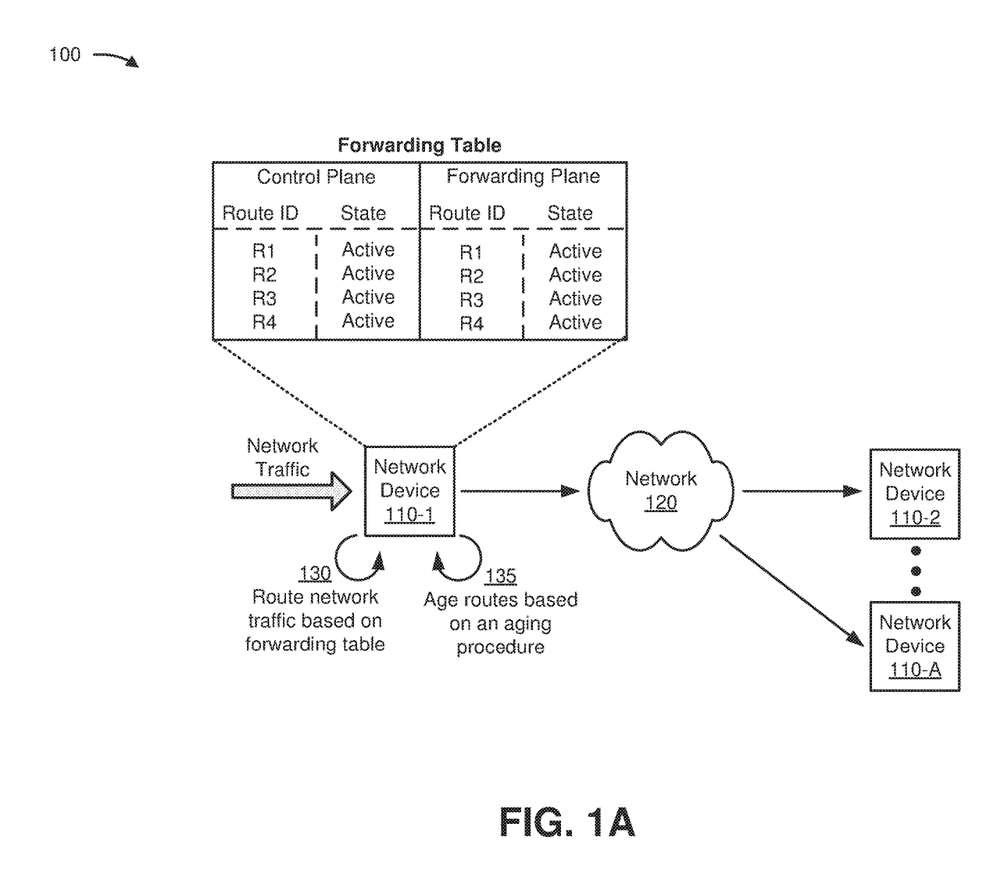
FIGS. 1A-1D are diagrams of an overview of an example implementation described herein.

FIGS. 1A-1D are diagrams of an overview of an example implementation 100 described herein. As shown in FIG. 1A, example implementation 100 may include a network device 110-1, one or more network devices 110-2 through 110-A (A≥1), and a network 120.

As further shown in FIG. 1A, and by reference number 130, network device 110-1 may receive network traffic and may route the network traffic based on information associated with a set of routes stored via a forwarding table. For example, network device 110-1 may include a forwarding table storing control plane route information (e.g., via a first data structure) and forwarding plane route information (e.g., via a second data structure). The set of routes may be associated with a particular status, such as an active status (e.g., the route has been utilized for directing network traffic within a threshold period of time), inactive status (e.g., the route has not been utilized for directing network traffic within the threshold period of time), or the like.

As further shown in FIG. 1A, network device 110-1 may receive a particular packet of the network traffic, identify an endpoint network device 110 for the particular packet (e.g., network device 110-2), and may utilize a route associated with network device 110-2 (e.g., R1) to direct the particular packet to network device 110-2 (e.g., via a set of intermediate network devices of network 120). As shown by reference number 135, network device 110-1 may age the set of routes based on an aging procedure. For example, network device 110-1 may determine whether a threshold period of time has elapsed from a previous utilization of a route, and may select an inactive status for the route when the threshold period of time has elapsed. Assume that route R2 has not been utilized within the threshold period of time.

Figure 1B:
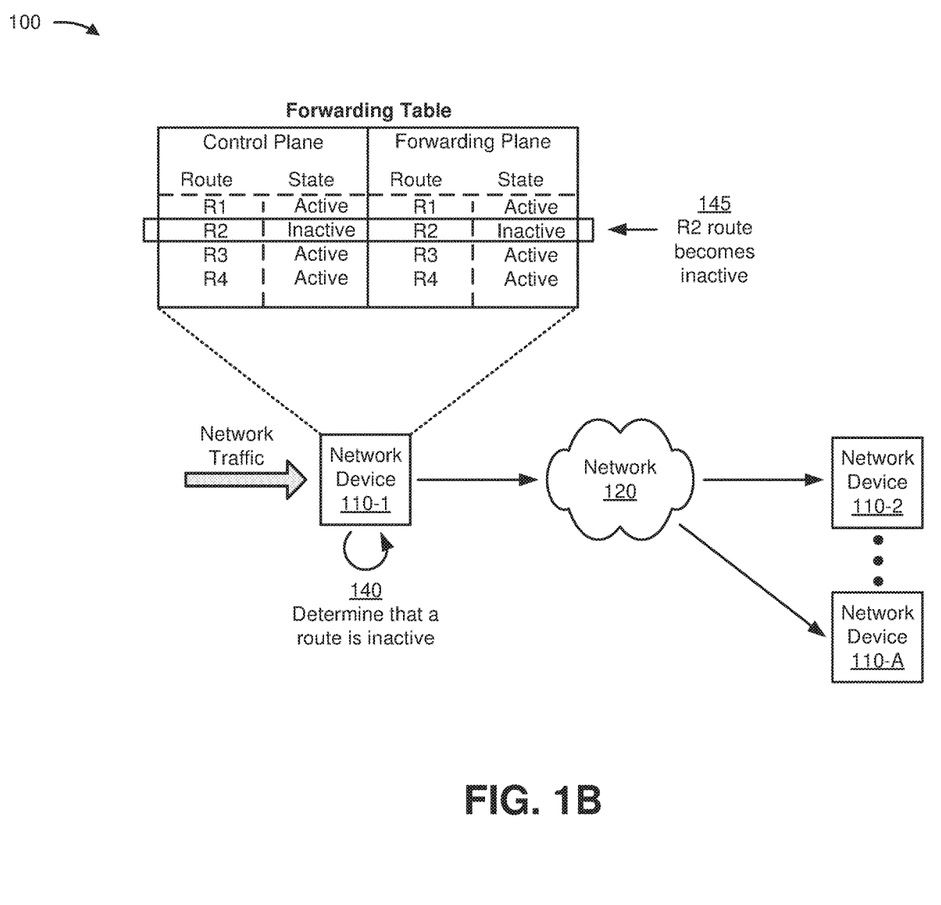

As shown in FIG. 1B, and by reference numbers 140 and 145, based on performing the aging procedure, network device 110-1 may determine that a particular route, R2, is inactive. For example, network device 110-1 may determine that a threshold period of time (e.g., 10 seconds, 100 seconds, or 1000 seconds) has elapsed since the particular route was utilized to direct a packet to an endpoint network device 110. In another example, network device 110-1 may rank a set of routes based on a recency of utilization, and may determine that the route does not satisfy a threshold recency relative to other routes of the set of routes. In another example, network device 110-1 may select a threshold period of time or a threshold recency based on a quantity of routes, of the set of routes, stored via the forwarding table.

Figure 1C:
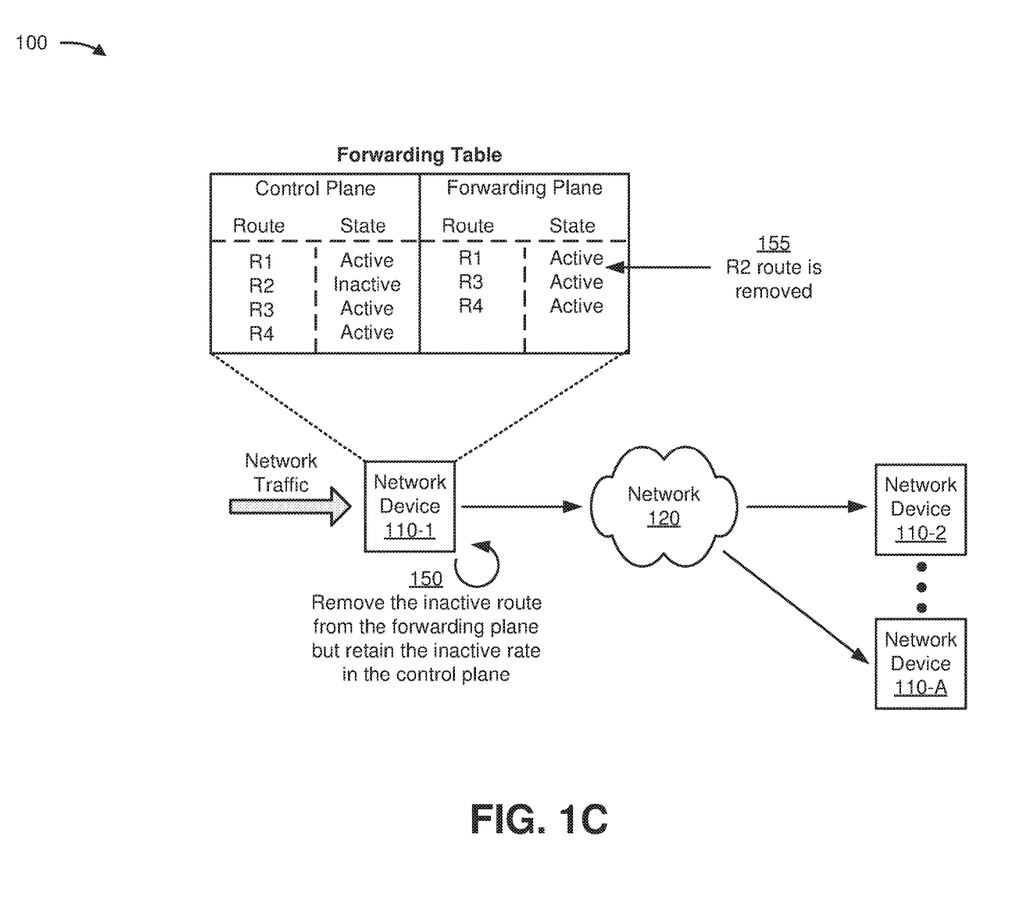

As shown in FIG. 1C, and by reference numbers 150 and 155, based on determining that the particular route is inactive, network device 110-1 may remove information identifying the route from a forwarding plane portion of the forwarding table. By contrast, network device 110-1 may retain information identifying the route in the control plane portion of the forwarding table. For example, network device 110-1 may replace information identifying the route, stored via a data structure, with information identifying another, active route. In this way, network device 110-1 reduces utilization of memory resources associated with storing the information identifying the route in the forwarding plane portion of the forwarding table, thereby permitting storage of another, active route.

Figure 1D:
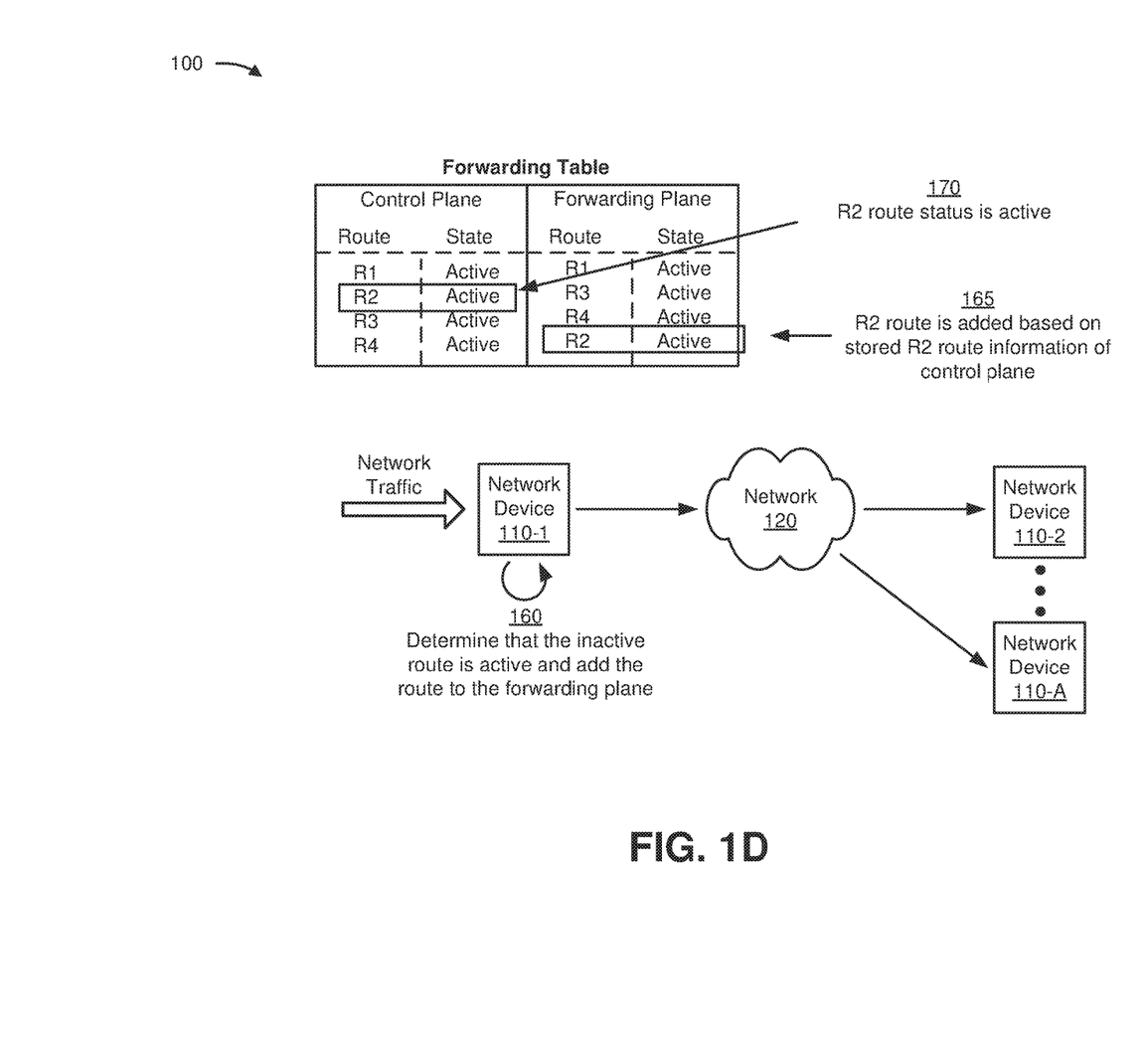

As shown in FIG. 1D, and by reference numbers 160, 165, and 170, at a subsequent time, network device 110-1 may determine that the particular route, R2, has become active, and may add information identifying the particular route to the forwarding plane portion of the forwarding table. For example, network device 110-1 may receive a packet of network traffic for routing to network device 110-2, and may determine that the route, R2, includes reachability information corresponding to network device 110-2. In this case, network device 110-1 may utilize information, retained via the control plane portion of the forwarding table and identifying the particular route, to include information identifying the particular route in the forwarding plane portion of the forwarding table. In this way, network device 110-1 reduces an amount of time required to add a route to a forwarding table for utilization in directing network traffic, thereby improving network performance relative to adding the route without having stored information identifying the route.

In this way, network device 110 installs only active routes and utilizes dynamic aging to remove inactive routes from a forwarding table, thereby reducing memory utilization relative to retaining all routes. Moreover, network device 110 retains information identifying the inactive routes in a control plane portion of the forwarding table, thereby reducing an amount of time required to add the route to a forwarding plane portion of the forwarding table when the route becomes active from an inactive status relative to removing information identifying inactive routes from both a control plane portion and a forwarding plane portion of a forwarding table.

As indicated above, FIGS. 1A-1D are provided merely as an example. Other examples are possible and may differ from what was described with regard to FIGS. 1A-1D.

Figure 2:
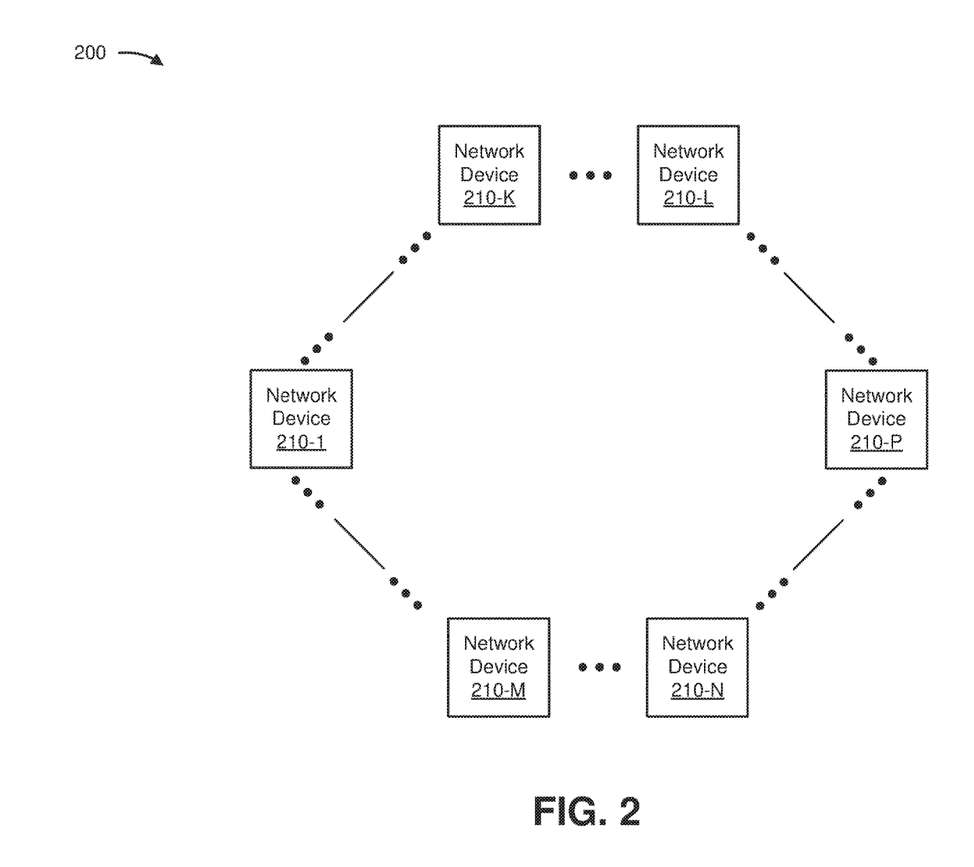
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210") and one or more networks. Devices of environment 200 may interconnect via wired connections, wireless connections, or a combination of wired and wireless connections.

Network device 210 may include one or more devices (e.g., one or more traffic transfer devices) capable of processing and/or transferring traffic associated with endpoint devices. For example, network device 210 may include a firewall, a router, a gateway, a switch, a hub, a bridge, reverse proxy, a server (e.g., a proxy server), a ToR device (e.g., a ToR switch), a load balancer, a user device, or a similar device. In some implementations, multiple network devices 210 may be associated with transferring traffic between endpoint devices. In some implementations, network device 210 may include a provider edge device (e.g., a PE), a customer edge device, a route reflector device, a peer device, an autonomous system boundary router, or the like. In some implementations, network device 210 may include a host device associated with providing network traffic to and/or receiving network traffic from a network that includes a set of network devices 210. For example network device 210 may include a server, a data storage device, a bare-metal device, or the like. In some implementations, network device 210 may be configured in association with a particular layer of the set of layers associated with the Open Systems Interconnection (OSI) model. For example, network device 210 may be configured as an L2 network device, an L3 network device, or the like. In some implementations, network device 210 corresponds to network devices 110-1, 110-2, . . . , or 110-A of FIGS. 1A-1D.

Network device 210 may be associated with one or more networks, in some implementations. Similarly, a network, of the one or more networks, may include one or more network devices 210. In some implementations, the one or more networks may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, a cloud-based computing network, an ad hoc network, an intranet, the Internet, a fiber optic-based network, a cloud computing network, an Ethernet virtual private network (EVPN) network (e.g., an L2 network, an L3 network, a combination of L2 and L3 networks, or a multiprotocol label switching (MPLS) network), a subnet network (e.g., a subnet), and/or a combination of these or other types of networks. In some implementations, the one or more networks correspond to network 120 of FIGS. 1A-1D.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
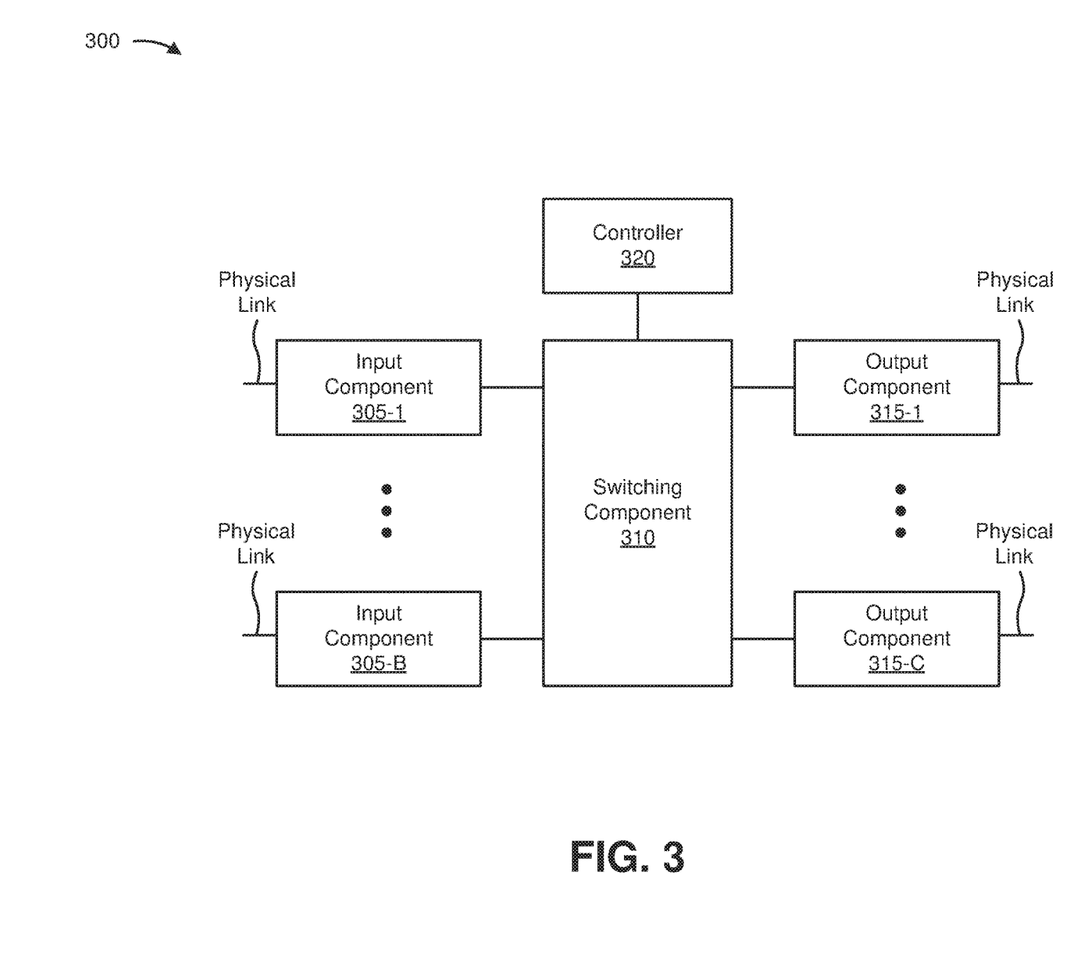
FIG. 3 is a diagram of example components of one or more devices of FIG. 2.

As shown in FIG. 3, device 300 may include a set of input components 305-1, . . . 305-B (B≥1) (referred to individually as input component 305 and collectively as input components 305), a switching component 310, a set of output components 315, . . . , 315-C (C≥1) (referred to individually as output component 315 and collectively as output components 315), and a controller 320. Components of device 300 may interconnect via wired connections, wireless connections, or a combination of wired and wireless connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (i.e., an input/output component may be a combination of input component 305 and output component 315).

Controller 320 includes a processor in the form of, for example, a central processing unit (CPU), a microprocessor, a field-programmable gate array (FPGA), an application-specific integrated circuit (ASIC), and/or another type of processor that can interpret and/or execute instructions. Controller 320 is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
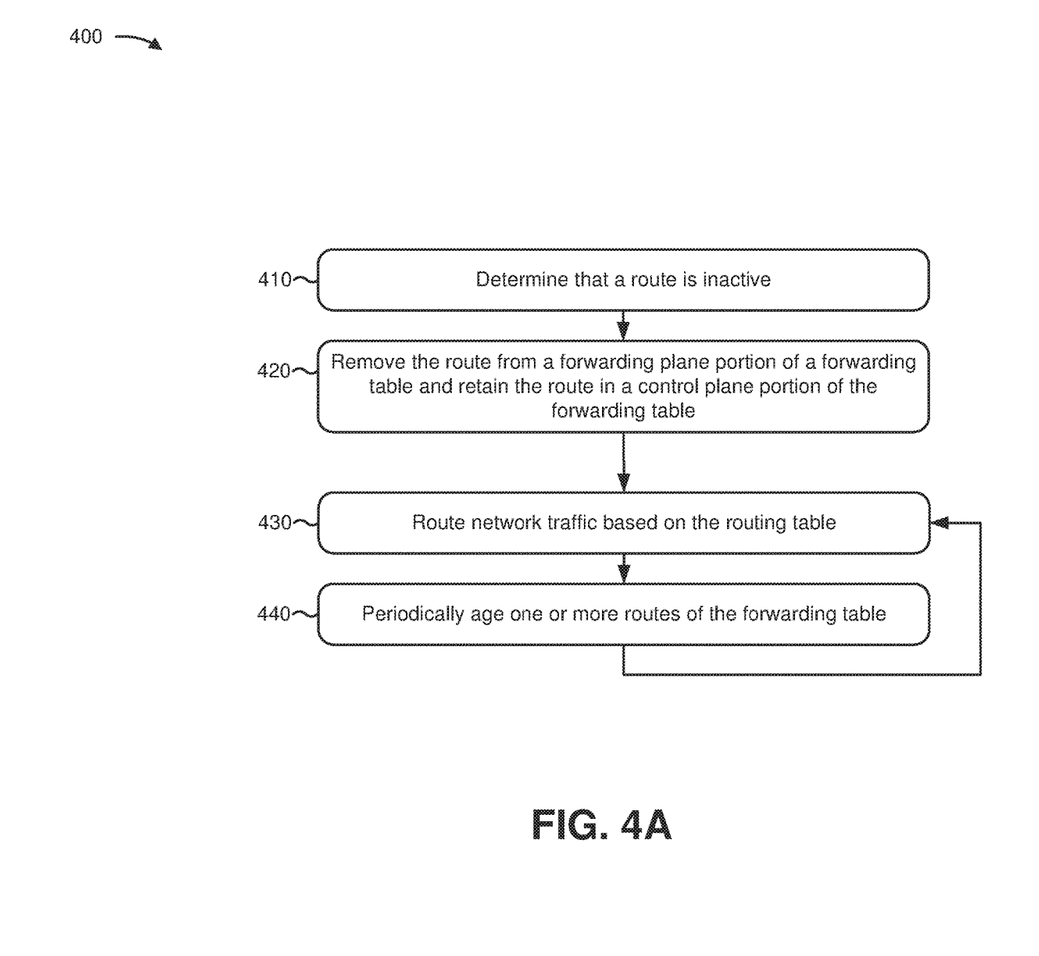
FIGS. 4A and 4B are flow charts of an example process for routing network traffic based on a forwarding table.
Figure 4B:
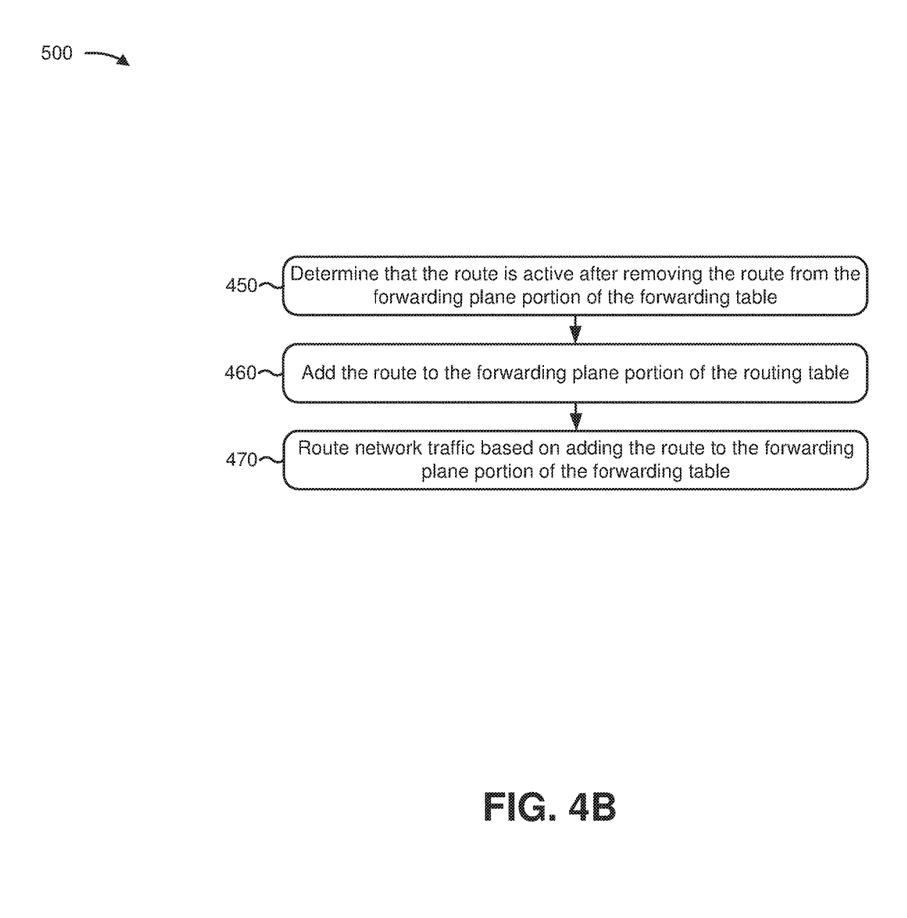

FIGS. 4A and 4B are flow charts of an example process 400 for routing network traffic based on a forwarding table. In some implementations, one or more process blocks of FIGS. 4A and 4B may be performed network device 210. In some implementations, one or more process blocks of FIGS. 4A and 4B may be performed by another device or a group of devices separate from or including network device 210.

As shown in FIG. 4A, process 400 may include determining that a route is inactive (block 410). For example, network device 210 may determine that the route is inactive. In some implementations, network device 210 may determine a status of the route based on a time threshold. For example, when the route is utilized to route network traffic, network device 210 may store a time identifier, and may determine that a period of time, which has elapsed from storing the time identifier, satisfies a time threshold. In this case, when the route is not utilized to route network traffic for a threshold period of time network device 210 may determine that the route is inactive. Similarly, network device 210 may determine that one or more other routes, for which a corresponding time identifier does not satisfy the time threshold, are active routes. Additionally, or alternatively, network device 210 may determine that a time threshold associated with installing the route is satisfied. For example, network device 210 may determine that a threshold amount of time from adding the route to the forwarding table has elapsed, and may determine that the route is inactive based on determining that the threshold amount of time has elapsed.

Additionally, or alternatively, network device 210 may determine that the route is inactive based on a status of one or more other routes included in the forwarding table. For example, network device 210 may order the set of routes based on a recency with which each route was utilized to route network traffic, and may select a particular quantity of routes as inactive a particular quantity of least recently utilized routes), a percentage of routes as inactive, or the like.

In some implementations, network device 210 may determine that the route is inactive based on performing an aging procedure. For example, network device 210 may set a particular aging interval (e.g., an amount of time or a quantity of iterations of the aging procedure), and may determine that the particular aging interval has been satisfied for the route when performing the aging procedure. In some implementations, network device 210 may alter the aging interval for the aging procedure (e.g., a dynamic aging procedure) based on a quantity of routes stored via a forwarding table. For example, when the quantity of routes stored via the forwarding table satisfies a threshold quantity, network device 210 may reduce an initial aging interval to cause the route to become inactive more rapidly relative to the initial aging interval. Additionally, or alternatively, network device 210 may increase an aging interval, such as when the quantity of routes stored via the forwarding table fails to satisfy the threshold quantity. In this way, network device 210 utilizes a dynamic aging procedure to reduce a likelihood that the forwarding table is filled with routes prior to least recently utilized routes becoming inactive.

As further shown in FIG. 4A, process 400 may include removing the route from a forwarding plane portion of a forwarding table and retaining the route in a control plane portion of the forwarding table (block 420). For example, network device 210 may remove the route from the forwarding plane portion of the forwarding table and retain the route in the control plane portion of the forwarding table. The control plane portion of the forwarding table may refer to information relating to determining a status of other network devices 210. The forwarding plane portion may refer to data utilized to parse packet headers, managing quality of service, filtering, or the like for directing packets.

In some implementations, network device 210 may delink the forwarding plane from the control plane. For example, network device 210 may permit the control plane portion of the forwarding table to store information regarding a first group of routes and/or network devices 210 and the forwarding plane portion of the forwarding table to store information regarding a second group of routes and/or network devices 210 (e.g., where the first group of routes and/or network devices 210 is different from the second group of routes and/or network devices 210). In this way, network device 210 is able to retain information relating to an inactive route via the control plane portion of the forwarding table after removing information relating to the inactive route from the forwarding plane portion of the forwarding table.

In some implementations, network device 210 may remove information identifying the route from the forwarding plane based on determining that the route is inactive. For example, network device 210 may cause a data structure associated with the forwarding plane to remove information identifying the route, to store information identifying another route, or the like. In some implementations, network device 210 may retain information identifying the route in the control plane after removing the information identifying the route from the forwarding plane. For example, based on delinking the control plane from the forwarding plane, network device 210 may permit the control plane to continue storing information identifying the route and the forwarding plane to remove the information identifying the route. In this way, network device 210 reduces a data storage requirement for the forwarding plane relative to requiring that the forwarding plane store information identifying each route for which corresponding information is stored via the control plane.

As further shown in FIG. 4A, process 400 may include routing network traffic based on the forwarding table (block 430). For example, network device 210 may route network traffic based on the forwarding table. In some implementations, network device 210 may utilize the forwarding table to identify an endpoint network device 210, direct one or more packets to endpoint network device 210, apply a filtering policy to a set of packets, or the like. For example, network device 210 may receive a set of packets from a first one or more endpoint network devices 210, may parse the set of packets to identify a second one or more endpoint network devices 210, and may direct the set of packets toward the one or more endpoint network devices 210 based on the forwarding table.

As further shown in FIG. 4A, process 400 may include periodically aging one or more routes of the forwarding table (block 440). For example, network device 210 may periodically age the one or more routes of the forwarding table. In some implementations, network device 210 may age the one or more routes of the forwarding plane portion of the forwarding table. For example, network device 210 may age the one or more routes based on an aging procedure (e.g., increment a counter to determine a recency with which a particular route was utilized or monitor a time threshold to determine whether a particular route fails to satisfy a threshold recency). In some implementations, network device 210 may alter an aging interval associated with the aging procedure to cause a particular route to become inactive more rapidly, thereby permitting network device 210 to remove the particular route from e forwarding table and reducing a utilization of memory resources relative to retaining the particular route.

In some implementations, network device 210 may age one or more routes of the control plane portion of the forwarding table. For example, network device 210 may select an aging interval for the control plane (e.g., a different aging interval than for the forwarding plan and may cause a particular route to be removed from the control plane based on a threshold period of time associated with the aging interval for the control plane being satisfied. In some implementations, network device 210 may age one or more routes of the control plane portion of the forwarding table based on removal of a particular route from the forwarding plane portion of the forwarding table. In some implementations, network device 210 may perform an aging procedure after a threshold period of time. For example, network device 210 may determine that a threshold period of time has elapsed, and may determine whether each route remains active (e.g., another threshold period of time has not elapsed for each route) based on determining that the threshold period of time has elapsed. Additionally, or alternatively, network device 210 may perform the aging procedure based on determining that a quantity of routes stored via the forwarding table satisfies a threshold.

As shown in FIG. 4B, process 400 may include determining that the route is active after removing the route from the forwarding plane portion of the forwarding table (block 450). For example, network device 210 may determine that the route is active after removing the route from the forwarding plane portion of the forwarding table. In some implementations, network device 210 may determine that the route is active based on receiving network traffic that is to be directed toward an endpoint network device 210 via the route (e.g., based on packet header information or other routing information). For example, network device 210 may receive a packet, and may determine that the packet is to be directed toward a particular endpoint network device 210 via the route. In this case, network device 210 may determine that the route s active based on determining that the packet is to be directed toward the particular endpoint network device 210 via the route. Additionally, or alternatively, network device 210 may receive information indicating that the route is active. For example, network device 210 may receive a control message indicating that the route has become active (e.g., from another network device 210), and may determine that the route is active based on the control message.

As further shown in FIG. 4B, process 400 may include adding the route to the forwarding plane portion of the forwarding table (block 460). For example, network device 210 may add the route to the forwarding plane portion of the forwarding table. In some implementations, network device 210 may add the route to the forwarding plane portion of the forwarding table based on information stored in the control plane portion of the forwarding table. For example, when information identifying the route remains stored via the control plane portion of the forwarding table (e.g., an aging interval associated with the control plane portion of the forwarding table has not been satisfied), network device 210 may utilize the information identifying the route to add the route to the forwarding plane portion of the forwarding table. In this way, network device 210 reduces an amount of time necessary to install the route to the forwarding plane portion of the forwarding table relative to network device 210 relearning the route based on exchanging one or more messages with one or more other network devices 210.

In some implementations, network device 210 may store information indicating that the route has been installed in the forwarding plane portion of the forwarding table after being removed from the forwarding plane portion of the forwarding table. For example, network device 210 may store information indicating a quantity of times the route has transferred states (e.g., from an active state to an inactive state and/or from the inactive state to the active state). In some implementations, network device 210 may omit the route from being removed from the forwarding plane portion of the forwarding table. For example, when the quantity of times that the route has transferred states satisfies a threshold, network device 210 may cause the route to remain stored via the forwarding plane portion of the forwarding plane table (e.g., after a time threshold has been satisfied). In this way, network device 210 reduces a utilization of processing resources relative to repeatedly removing/adding the same route from/to the forwarding plane portion of the forwarding table.

As further shown in FIG. 4B, process 400 may include routing the network traffic based on adding the route to the forwarding plane portion of the forwarding table (block 470). For example, network device 210 may route the network traffic based on adding the route to the forwarding plane portion of the forwarding table. In some implementations, network device 210 may route the network traffic via the route. For example, network device 210 may utilize information identifying the route, stored via the forwarding plane portion of the forwarding table, to direct one or more packets toward an endpoint network device 210 associated with the route. In some implementations, network device 210 may periodically perform an aging procedure on one or more routes of the forwarding table to determine whether the one or more routes remain active.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

In this way, network device 210 installs only active routes in the forwarding plane portion of the forwarding table, thereby reducing a likelihood that insufficient memory resources are available to add another route to the forwarding plane portion of the forwarding table relative to maintaining inactive routes in the forwarding plane portion of the forwarding table. Moreover, based on retaining information identifying an inactive route in the control plane portion of the forwarding table, network device 210 reduces an amount of time required to add the inactive route to the forwarding plane portion of the forwarding table when the inactive becomes active, relative to not storing any information identifying the inactive route.

The foregoing disclosure provides illustration and description, but is not intended to be exhaustive or to limit the implementations to the precise form disclosed. Modifications and variation are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors to:
      determine that a route is inactive,
         information identifying the route being stored in a first data structure of a forwarding table and a second data structure of the forwarding table;
      remove the information identifying the route from the first data structure of the forwarding table without removing the information identifying the route from the second data structure of the forwarding table based on determining that the route is inactive;
      determine that the route is active; and
      add the information identifying the route to the first data structure of the forwarding table based on information identifying the route stored via the second data structure of the forwarding table.

2. The device of claim 1, where the route is associated with directing network traffic toward an endpoint network device.

3. The device of claim 1, where the first data structure is associated with a forwarding plane portion of the forwarding table and the second data structure is associated with a control plane portion of the forwarding table.

4. The device of claim 1, where the one or more processors are further to:
   determine that an age interval, associated with utilizing the route to direct network traffic, is satisfied; and
   where the one or more processors, when determining that the route is inactive, are to:
      determine that the route is inactive based on determining that the age interval, associated with utilizing the route to direct network traffic, is satisfied.

5. The device of claim 1, where the one or more processors are further to:
   determine, after adding the information identifying the route in the first data structure of the forwarding table, that the information identifying the route has been added or removed a threshold quantity of times;
   determine, after including the information identifying the route in the first data structure of the forwarding table, that the route is inactive; and
   retain the information identifying the route, after determining that the route is inactive, based on determining that the information identifying the route has been added or removed the threshold quantity of times.

6. The device of claim 1, where the one or more processors are further to:
   determine that a quantity of routes identified in the first data structure of the forwarding table satisfies a threshold;
   alter a threshold period of time associated with determining a status of the route from a first threshold period of time to a second threshold period of time based on determining that the quantity of routes satisfies the threshold,
   the second threshold period of time being less than the first threshold period of time; and
   where the one or more processors, when determining that the route is inactive, are to:
      determine that the second threshold period of time is elapsed after altering the threshold period of time from the first threshold period of time to the second threshold period of time; and
      determine that the route is inactive based on determining that the second threshold period of time is elapsed.

7. The device of claim 1, where the one or more processors are further to:
   determine that the first data structure of the forwarding table stores information identifying a threshold quantity of routes; and
   determine that the route is inactive based on determining that the first data structure of the forwarding table stores information identifying the threshold quantity of routes.

8. A non-transitory computer-readable medium storing instructions, the instructions comprising:

one or more instructions that, when executed by one or more processors, cause the one or more processors to:
   determine that a route is inactive,
      information identifying the route being stored in a forwarding plane portion of a forwarding table and a control plane portion of the forwarding table;
   remove the information identifying the route from the forwarding plane portion of the forwarding table without removing the information identifying the route from the control plane portion of the forwarding table based on determining that the route is inactive;
   determine that the route is active; and
   add the information identifying the route to the forwarding plane portion of the forwarding table based on information identifying the route stored via the control plane portion of the forwarding table.

9. The non-transitory computer-readable medium of claim 8, where the one or more instructions, when executed by the one or more processors, further cause the one or more processors to:
   route network traffic based on the forwarding table after adding the information identifying the route in the forwarding plane portion of the forwarding table.

10. The non-transitory computer-readable medium of claim 8, where the one or more instructions, when executed by the one or more processors, further cause the one or more processors to:
   determine that an age interval associated with utilizing the route to direct network traffic is satisfied; and
   where the one or more instructions, that cause the one or more processors to determine that the route is inactive, cause the one or more processors to:
      determine that the route is inactive based on determining that the age interval associated with utilizing the route to direct network traffic is satisfied.

11. The non-transitory computer-readable medium of claim 8, where the one or more instructions, when executed by the one or more processors, further cause the one or more processors to:
   determine, after storing the information identifying the route in the forwarding plane portion of the forwarding table, that the information identifying the route has been stored a threshold quantity of times;
   determine, after storing the information identifying the route in the forwarding plane portion of the forwarding table, that the route is inactive; and
   retain the information identifying the route, after determining that the route is inactive, based on determining that the information identifying the route has been stored the threshold quantity of times.

12. The non-transitory computer-readable medium of claim 8, where the one or more instructions, when executed by the one or more processors, further cause the one or more processors to:
   determine that a quantity of routes included in a set of routes identified in the forwarding plane portion of the forwarding table satisfies a threshold,
      the route being utilized least recently of the set of routes identified in the forwarding plane portion of the forwarding table;
   alter a threshold period of time associated with determining a status of the route from a first threshold period of time to a second threshold period of time based on determining that the quantity of routes satisfies the threshold,
      the second threshold period of time being less than the first threshold period of time; and
   where the one or more instructions, that cause the one or more processors to determine that the route is inactive, cause the one or more processors to:
      determine that the second threshold period of time is elapsed after altering the threshold period of time from the first threshold period of time to the second threshold period of time; and
      determine that the route is inactive based on determining that the second threshold period of time is elapsed.

13. The non-transitory computer-readable medium of claim 8, where the one or more instructions, when executed by the one or more processors, further cause the one or more processors to:
   determine that the forwarding plane portion of the forwarding table stores information identifying a threshold quantity of routes; and
   determine that the route is inactive based on determining that the forwarding plane portion of the forwarding table stores information identifying the threshold quantity of routes.

14. The non-transitory computer-readable medium of claim 8, where the route is associated with directing network traffic toward an endpoint network device.

15. A method, comprising:
   determining, by a device, that a route is inactive,
      the route being associated with directing network traffic toward an endpoint network device of a network,
      information identifying the route being stored in a first data structure of a forwarding table and a second data structure of the forwarding table;
   removing, by the device, information identifying the route from the first data structure associated with the forwarding table without removing the information identifying the route from the second data structure of the forwarding table based on determining that the route is inactive;
   routing, by the device, network traffic based on the forwarding table after removing the information identifying the route from the first data structure;
   determining, by the device and after routing the network traffic, that the route is active; and
   adding, by the device, the information identifying the route to the first data structure of the forwarding table based on information identifying the route stored via the second data structure of the forwarding table.

16. The method of claim 15, further comprising:
   routing the network traffic based on the forwarding table after adding the information identifying the route to the first data structure.

17. The method of claim 15, further comprising:
   determining, after adding the information identifying the route to the first data structure, that the information identifying the route has been removed from or added to the first data structure a threshold quantity of times;
   determining, after storing the information identifying the route in the first data structure of the forwarding table, that the route is inactive; and
   retaining the information identifying the route, after determining that the route is inactive, based on determining that the information identifying the route has been stored the threshold quantity of times.

18. The method of claim 15, further comprising:
determining that the first data structure of the forwarding table stores information identifying a threshold quantity of routes; and
determining that the route is inactive based on determining that the first data structure of the forwarding table stores information identifying the threshold quantity of routes.

19. The method of claim 15, where the route is a layer 2 or layer 3 route of the Open Systems Interconnection (OSI) model.

20. The method of claim 15, where the device is a top of rack (ToR) device of the network.

* * * * *